US012614475B2

(12) United States Patent
Blouin et al.

(10) Patent No.: US 12,614,475 B2
(45) Date of Patent: Apr. 28, 2026

(54) SYSTEMS AND METHODS FOR FACILITATING TOURING IN A VEHICLE

(71) Applicant: Ford Global Technologies, LLC, Dearborn, MI (US)

(72) Inventors: Alexander Blouin, Ann Arbor, MI (US); Kevin King, Detroit, MI (US); Jacob Michael Haspiel, Ann Arbor, MI (US); Robin Mathew Kurian, Canton, MI (US); Zhimin Yang, Northville, MI (US); Stefan Bankowski, Royal Oak, MI (US); Ryan Alexander Bright, Southfield, MI (US)

( * ) Notice: Subject to any disclaimer, the term of this patent is extended or adjusted under 35 U.S.C. 154(b) by 279 days.

(21) Appl. No.: 18/462,291

(22) Filed: Sep. 6, 2023

(65) Prior Publication Data

US 2025/0078686 A1     Mar. 6, 2025

(51) Int. Cl.
*G09B 29/10* (2006.01)
*B60H 3/00* (2006.01)

(52) U.S. Cl.
CPC ......... *G09B 29/106* (2013.01); *B60H 3/0035* (2013.01)

(58) Field of Classification Search
None
See application file for complete search history.

(56) References Cited

U.S. PATENT DOCUMENTS

2009/0005080 A1     1/2009  Forstall et al.
2009/0150768 A1     6/2009  Bae et al.

2013/0184932 A1*  7/2013  Dove ................. H04N 21/4542
                                                                701/36
2014/0019004 A1*  1/2014  Peplin ................. G01C 21/343
                                                                701/1
2014/0106726 A1*  4/2014  Crosbie ................. B60K 35/22
                                                                455/418
2014/0201004 A1    7/2014  Parundekar et al.
(Continued)

FOREIGN PATENT DOCUMENTS

CN          108647232 A  * 10/2018  ............. G06Q 50/14
CN          114091749 A     2/2022
JP          2020095596 A     6/2020

OTHER PUBLICATIONS

Machine translation of CN 108647232A (Year: 2025).*
(Continued)

*Primary Examiner* — Jennifer M Anda
(74) *Attorney, Agent, or Firm* — Emily Campbell; Eversheds Sutherland (US) LLP

(57)                    ABSTRACT

A vehicle including a transceiver, a telematics control unit and a processor is disclosed. The transceiver may be configured to receive tour information associated with a tour, and the telematics control unit may be determine a real-time vehicle geolocation. The processor may be configured to obtain a trigger signal, and obtain the tour information and the real-time vehicle geolocation responsive to obtaining the trigger signal. The processor may be further configured to determine that a predefined condition may be met based on the tour information and the real-time vehicle geolocation. The processor may modify a first vehicle component setting associated with a vehicle component to a second vehicle component setting, responsive to determining that the predefined condition may be met.

17 Claims, 7 Drawing Sheets

400

(56) References Cited

U.S. PATENT DOCUMENTS

| | | | |
|---|---|---|---|
| 2016/0097646 A1* | 4/2016 | Alonso | H04L 67/535 |
| | | | 701/408 |
| 2020/0041289 A1* | 2/2020 | Mokhnatkina | G01C 21/343 |
| 2020/0154233 A1* | 5/2020 | Iannotti | H04W 4/02 |
| 2020/0314592 A1* | 10/2020 | Dunn, Jr. | H04W 4/026 |
| 2023/0032468 A1* | 2/2023 | Ota | G01C 21/3682 |

OTHER PUBLICATIONS

Smirnov et al. "Smart Space-Based in-Vehicle Application for e-TourismTechnological Framework and Implementation for Ford SYNC" pp. 52-61, 2014.

* cited by examiner

700

702 — Start

704 — Obtain a trigger signal

706 — Obtain tour information and real-time vehicle geolocation

708 — Determine that a predefined condition is met

710 — Modify a vehicle component setting

712 — Stop

SYSTEMS AND METHODS FOR FACILITATING TOURING IN A VEHICLE

FIELD

The present disclosure relates to systems and methods for facilitating touring in a vehicle.

BACKGROUND

While on a vacation or visiting a new city, users may desire to take tours according to their interests. For example, users may desire to take local tours associated with nature, history, food, science, etc. Many users prefer to hire tour guides to make their tours engaging and informative. It is known that experienced and skilled tour guides are difficult to find and are expensive. Further, a user may have to spend considerable time and effort searching for a good tour guide, which may cause inconvenience to the user.

Thus, a system is required to facilitate a user in conveniently taking a tour, without requiring to search for a tour guide.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
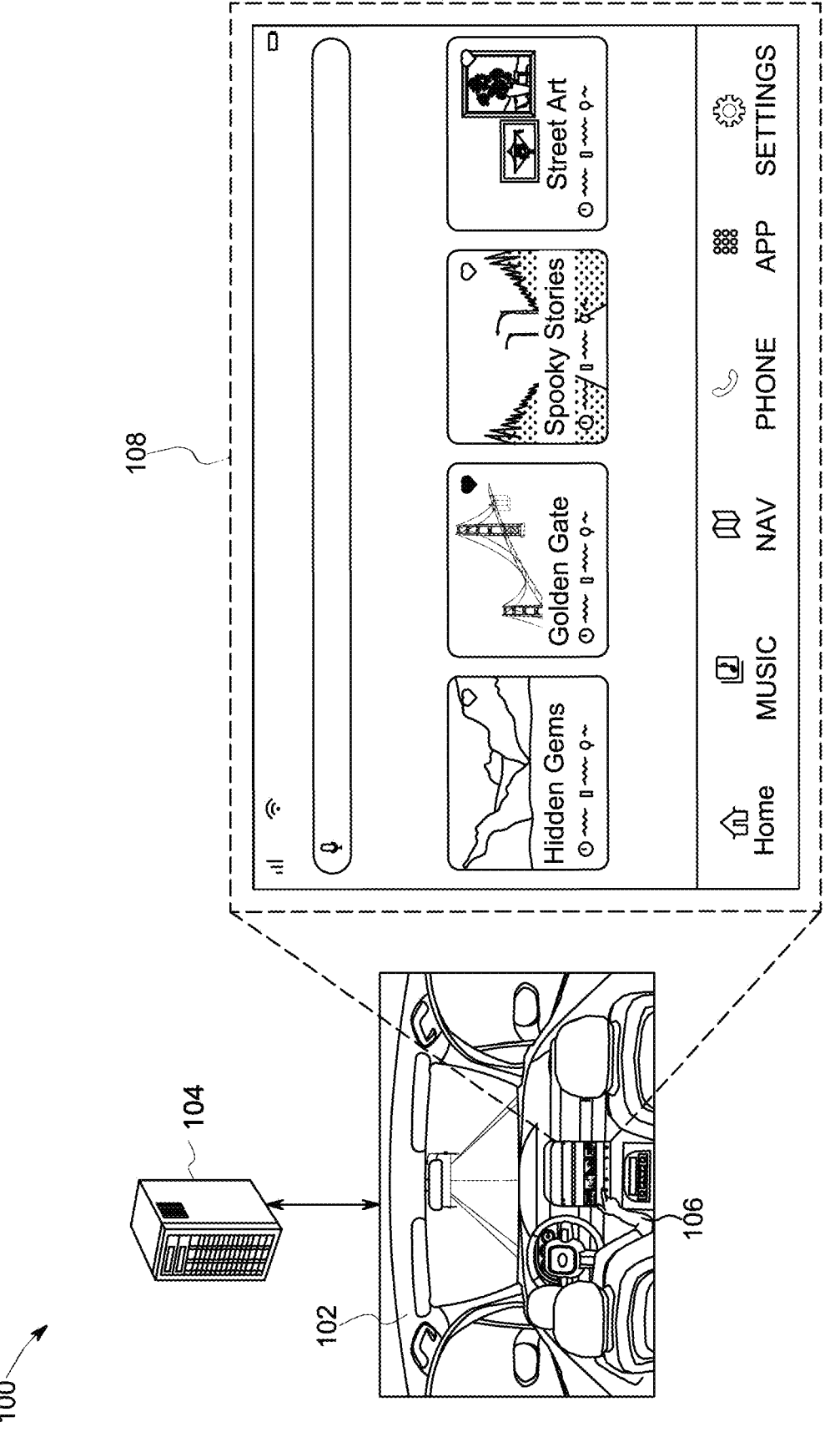
FIG. 1 depicts an example environment in which techniques and structures for providing the systems and methods disclosed herein may be implemented.

The present disclosure describes a vehicle configured to facilitate a user in taking a tour. The tour may be associated with one or more interest areas associated with the user, e.g., nature, food, science, haunted places, etc. The vehicle may be communicatively coupled with a server that may store tour information associated with a plurality of tours. The server may be a crowdsourcing server, to which a plurality of tour operators, firms, tour guides, individuals, etc. may transmit tour information associated with the plurality of tours. The tour information may include, for example, geolocations associated with a plurality of points of interest (POIs) in a geographical area where the tour or the vehicle may be located, audio, video and/or textual message or content associated with each POI, settings associated with one or more vehicle components associated with each POI, and/or the like. The server may transmit the tour information associated with the plurality of tours to the vehicle, when the user transmits a request to view the tour information to the server via a vehicle infotainment system or a user device. Responsive to obtaining the tour information from the server, the vehicle may display the tour information on the infotainment system and the user may select a tour to take or enroll into based on the displayed tour information. Responsive to obtaining user's tour selection, the vehicle may assist the user in navigating on the route associated with the tour based on the tour information obtained from the server.

In some aspects, the vehicle may be configured to track real-time vehicle location when the vehicle may be travelling on the tour. Responsive to tracking the real-time vehicle location, the vehicle may determine when the vehicle reaches in proximity to a geolocation associated with a POI ("POI geolocation"). The vehicle may cause the infotainment system to output the audio, video and/or textual message or content associated with the POI when the vehicle reaches in proximity to the POI geolocation. In further aspects, the vehicle may modify settings of one or more vehicle components based on the tour information, when the vehicle reaches in proximity to the POI geolocation. For example, the vehicle may activate one or more vehicle interior lights or cause the vehicle interior lights to flash when the vehicle reaches in proximity to the POI geolocation. As another aspects, the vehicle may cause driver's sitting area to elevate or vibrate when the vehicle reaches in proximity to the POI geolocation.

In some aspects, the vehicle may cause the infotainment system to output the audio, video and/or textual message or content associated with the POI and/or modify vehicle component settings based on vehicle's motion status. For example, the vehicle may cause the infotainment system to output only audio message when the vehicle may be in motion in proximity to the POI geolocation, and may cause the infotainment system to output video and/or textual message or content when the vehicle may be stationary in proximity to the POI geolocation. As another example, the vehicle may cause the vehicle interior lights to flash when the vehicle may be stationary in proximity to the POI geolocation, and may cause the vehicle interior lights to dim (or reduce light's illumination intensity) when the vehicle may be in motion in proximity to the POI geolocation.

The present disclosure discloses a vehicle that may assist a user in touring, without requiring the user to search for tour guides. The user may browse information associated with a plurality of tours available in a geographical area where the vehicle may be located by using vehicle's infotainment system while the user may be sitting inside the vehicle, thus enhancing user's convenience of searching for a tour as per user's requirements. Further, the vehicle assists the user in navigating through the tour, and outputs audio, video and/or textual messages to enhance user's experience of touring. Additional haptic feedback and/or visual or audible feedback provided by one or more vehicle's components further enhances user's tour experience in the vehicle.

These and other advantages of the present disclosure are provided in detail herein. The systems and method of the present disclosure should not be permitted unless the vehicle is in park, off, not in motion, and/or otherwise in a safe operational mode for enjoyment of the disclosure systems and methods, which mode may include operating in a fully autonomous vehicle, as an example.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a server 104 that may be communicatively coupled with each other. The vehicle 102 may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially or fully autonomous mode. In the exemplary aspect depicted in FIG. 1, a user 106 may be sitting in and/or driving the vehicle 102.

The server 104 may be configured to store information associated with a plurality of tours that may be available in a geographical area where the vehicle 102 may be located. The tours may be associated with different types of interest areas that the user 106 may have including, but not limited to, nature, food, history, science, culture, and/or the like. For example, a first tour may be associated with museums or historical places in the geographical area where the vehicle 102 may be located, a second tour may be associated with famous pubs in the geographical area, a third tour may be associated with haunted places (or spooky stories) in the geographical area, and/or the like.

In some aspects, the server 104 may obtain information associated with the plurality of tours (or "tour information") from a plurality of user devices, databases, etc. (not shown) that may be associated with a plurality of tour operating firms, individual tour guides, local experts, and/or the like. The tour operating firms, tour guides, local experts, etc. may share respective tour information to the server 104 to facilitate a plurality of users (including the user 106) who may be visiting the geographical area to conveniently select and take or enroll into one or more tours.

In an exemplary aspect, the tour information may include a plurality of geolocations associated with a plurality of points of interest (POIs) associated with the tour in the geographical area where the vehicle 102 may be located, an audio message and/or a video message associated with each POI, a textual content associated with each POI, one or more vehicle component settings associated with each POI, and/or the like. For example, if the tour is associated with haunted places (or spooky stories), the tour information may include geolocations of a plurality of haunted places in the geographical area where the vehicle 102 may be located, an audio/video message and/or textual content associated with each haunted place explaining/describing the history of the haunted place, details of past paranormal activities associated with the haunted place, etc., and expected vehicle component settings when the vehicle 102 passes by or stops at the haunted place. As an example, the tour information may indicate that vehicle lights may flash or their intensity may be automatically decreased when the vehicle 102 passes by the haunted place, or a heating, ventilation and air conditioning (HVAC) system of the vehicle 102 may blow cold air when the vehicle 102 passes by the haunted place, and/or the like. Such audio/video message, textual content and/or vehicle component settings may enable the user 106 to get an immersive tour experience.

In some aspects, the server 104 may be a crowdsourcing server, to which a plurality of individuals or firms may transmit information associated with the tours that they are experts in and may provide content for. In an exemplary aspect, a server operator (that may an Artificial Intelligence based system or a human operator) may screen the tour information submitted/transmitted to the server 104, and may store only that tour information on the server 104 that meets preset quality and/or quantity threshold standards (that may be set by the server operator).

Figure 2:
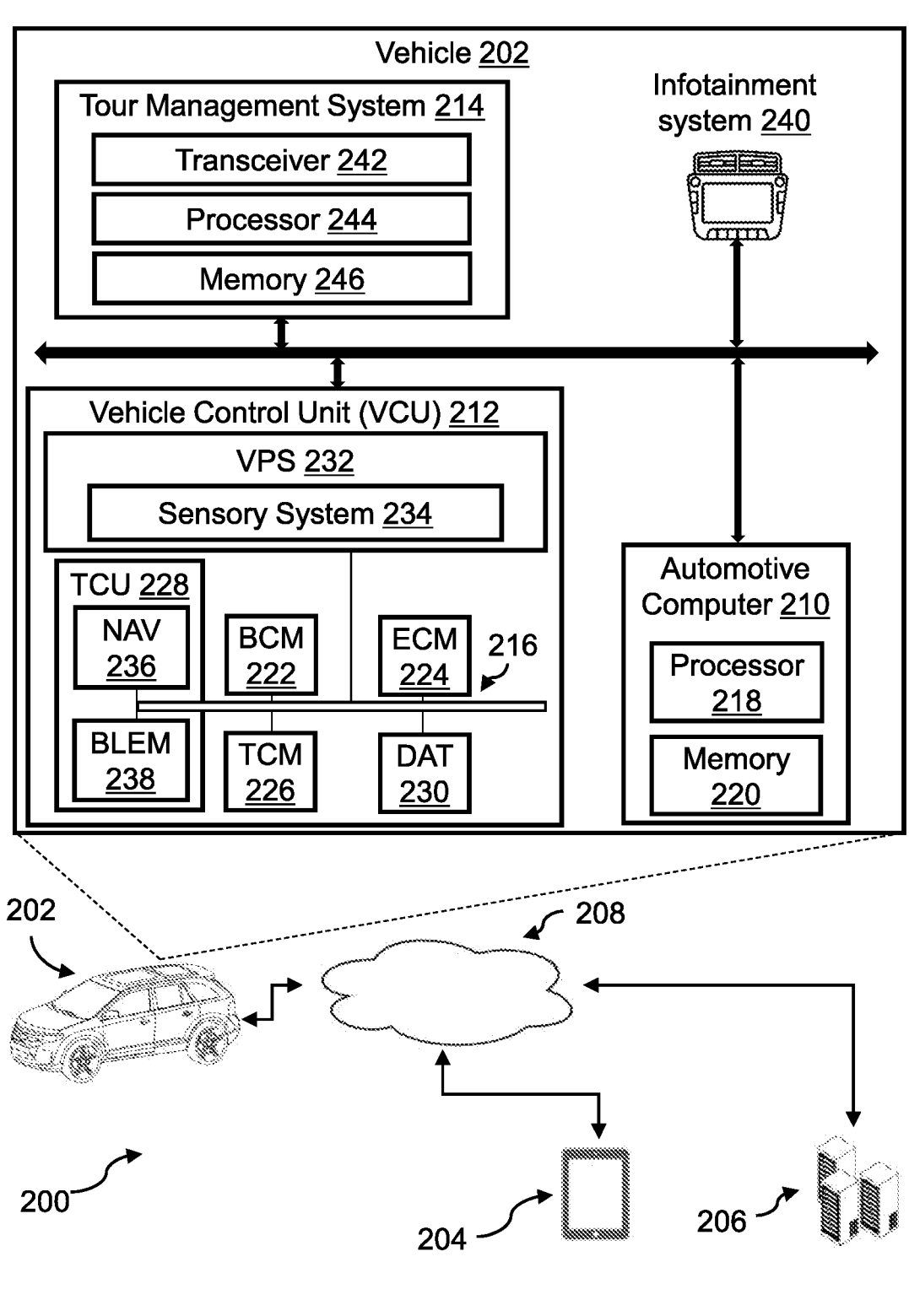
FIG. 2 depicts a block diagram of an example system to facilitate touring in a vehicle in accordance with the present disclosure.

The user 106 may access the tour information stored on the server 104 to select/decide a tour that the user 106 may desire to take/enroll into, e.g., via a vehicle infotainment system (shown as infotainment system 240 in FIG. 2) and/or a user device (shown as user device 204 in FIG. 2). In an exemplary aspect, to select a tour to enroll into, the user 106 may first access the server 104, via the vehicle infotainment system, and may transmit/input one or more user's interest areas to the server 104. For example, the user 106 may input "nature" and "spooky stories" as the user's interest areas.

Responsive to receiving the user's interest areas, the server 104 may transmit tour information associated with one or more tours that may be available in the geographical area where the vehicle 102 may be located and that may be associated with the user's interest areas. Responsive to receiving the tour information from the server 104, the vehicle infotainment system may display the tour information. In some aspects, the server 104 may not transmit entire or all of the tour information associated with each tour, but may transmit a preview or portion (or snippets) of tour information. For example, instead of transmitting geolocations and textual content associated with all the POIs on the tours, the server 104 may transmit a preview of textual content and geolocations of a subset of POIs associated with each tour, so that the user 106 may get an indication of what the user 106 may expect on the tour.

Based on the tour information (specifically, the preview of tour information) that may be displayed on the vehicle infotainment system, the user 106 may select a tour to take or enroll into.

In other aspects, the user 106 may not input any specific user's interest area while accessing the server 104. In this case, the server 104 may itself identify and recommend different types of tours that the user 106 may take, based on the geographical area where the vehicle 102 may be located, historical data indicating the tours that the user 106 may have taken in the past, and/or the like. An example view 108 of a vehicle information system screen is depicted in FIG. 1, in which one or more recommended tours are displayed for the user 106. The recommended tours may be associated with, e.g., hidden gems, golden gate of San Francisco, spooky stories, street art, etc. The user 106 may browse the recommended tours (and view corresponding preview of tour information) on the vehicle infotainment system, and may select a tour to take or enroll into. In some aspects, the vehicle 102 may be stationary when the user 106 selects the tour.

Responsive to the user 106 selecting the tour, the server 104 may transmit the tour information (e.g., full or entire tour information) associated with the selected tour to the vehicle 102. In other aspects, the server 104 may transmit the tour information to the vehicle 102 when the user 106 selects the tour and when the vehicle 102 commences travel/motion (i.e., when the vehicle 102 starts to move).

Based on the obtained tour information, the vehicle 102 (or a "tour management system" of the vehicle 102, shown as tour management system 214 in FIG. 2) may assist the user 106 in commencing the tour or taking the tour by outputting turn-by-turn navigation instructions from the vehicle infotainment system, as the user 106 drives the vehicle 102 or when the vehicle 102 moves. In some aspects, the tour management system ("system") may determine or obtain turn-by-turn navigation instructions based on the geolocations of the POIs included in the tour information, and a digital map of the geographical area where the vehicle 102 may be located (that the system may obtain from the server 104 or any other server providing navigation services to the vehicle 102). In an exemplary aspect, the system may first navigate the vehicle 102 to a first POI that may be closest to a current vehicle geolocation, then to a second POI that may be next in the route associated with the tour, and so on.

In some aspects, when the vehicle 102 reaches a geolocation associated with a POI ("POI geolocation") or is located at the POI geolocation, the system may determine whether the vehicle 102 is stationary (e.g., parked or travelling at a speed less than 4-5 miles per hour) or in motion. Based on the determination of the vehicle motion status, the system may cause the vehicle infotainment system to output messages/content associated with the POI, based on the tour information obtained from the server 104. For example, the system may cause the vehicle infotainment system to output audio message/content associated with the POI and not video or textual message/content, when the system determines that the vehicle 102 may be in motion. On the other hand, the system may cause the vehicle infotainment system to output video and/or textual message/content when the system determines that the vehicle 102 may be stationary. In further aspects, the system may enable the user 106 to purchase additional (and paid) content (e.g., additional stories, movies, etc.) associated with the POI from the server 104, when the system determines that the vehicle 102 may be stationary.

In additional aspects, based on the tour information, the system may modify settings of one or more vehicle components when the system determines that the vehicle 102 may be located at the POI geolocation. For example, the system may cause vehicle interior lights to automatically flash or dim (which may correspond to the vehicle component settings included in the tour information associated with the POI), when the vehicle 102 may be located at the POI geolocation. As another example, the system may cause user sitting area to automatically vibrate when the vehicle 102 may be located at the POI geolocation.

In some aspects, the system may modify settings of one or more vehicle components, as described above, based on the vehicle motion status (e.g., whether the vehicle 102 is stationary or in motion). For example, the system may not cause the user sitting area to vibrate or the vehicle interior lights to flash when the system determines that the vehicle 102 may be in motion. In this case, the system may only dim the lights. On the other hands, the system may enable user sitting area vibration and/or light flashing operation when the vehicle 102 may be stationary. In additional aspects, the system may modify vehicle component settings based on user preferences. For example, the system may not enable the user sitting area vibration if the user has disabled sitting area vibration feature on the vehicle 102, even if the tour information indicates that the user sitting area should vibrate when the vehicle 102 reaches the POI geolocation.

In this manner, the system enables the user 106 to get an immersive and informative tour experience, without requiring to hire any external tour guide. In some aspects, the user 106 may provide ratings, reviews, feedback, etc. for the tour to the server 104 after the tour may be completed. The server 104 may publish the feedback/reviews for other users' reference.

The details of the system to facilitate touring in the vehicle 102 are described below in conjunction with FIG. 2.

The vehicle 102, the server 104 and the tour management system implement and/or perform operations, as described here in the present disclosure, in accordance with the owner manual and safety guidelines. In addition, any action taken by the user 106 based on recommendations or notifications provided by the vehicle 102, the server 104 and the tour management system should comply with all the rules specific to the location and operation of the vehicle 102 (e.g., Federal, state, country, city, etc.). The recommendation or notifications, as provided by the vehicle 102, the server 104 and the tour management system should be treated as suggestions and only followed according to any rules specific to the location and operation of the vehicle 102.

FIG. 2 depicts a block diagram of an example system 200 to facilitate touring in a vehicle 202 in accordance with the present disclosure. The vehicle 202 may be same as the vehicle 102 described above. While describing FIG. 2, references will be made to FIGS. 3, 4, 5 and 6.

The system 200 may include the vehicle 202, a user device 204 and one or more servers 206 communicatively coupled with each other via one or more networks 208. The user device 204 may be associated with the user 106. The user device 204 may be, for example, a mobile phone, a laptop, a computer, a tablet, a wearable device, or any other similar device with communication capabilities. The server(s) 206 may be same as the server 104 described above in conjunction with FIG. 1. In additional aspects, the server (s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may be associated with a navigation services firm, and may be configured to provide a digital map of a geographical area where the vehicle 202 may be located, to the vehicle 202. The server(s) 206 may be further configured to store information associated with historical tours taken by the user 106.

As described above, the server 206 may be a crowdsourcing server, to which a plurality of individuals or firms may transmit information associated with the tours that they are experts in and may provide content for. In some aspects, to upload/transmit information associated with a tour (or tour information, as described above in conjunction with FIG. 1) on the server 206, an operator may first create an account on the server 206. Responsive to creating the account, the server 206 may provide access to one or more tutorials to the operator, viewing which the operator may understand the process of "creating a tour instance" on the server 206 and transmitting the tour information to the server 206.

Responsive to understanding the process, the operator may input a name for the tour (e.g., "Spooky Stories" tour) associated with a geographical area, and upload/transmit the tour information to the server 206. In some aspects, the tour information may include, but is not limited to, geolocations of a plurality of POIs in the geographical area associated with the tour, one or more images or videos associated with each POI, audio message and/or video message associated with each POI, textual content associated with each POI, one or more vehicle component settings associated with each POI, user interest keywords associated with the tour (e.g., whether the tour is associated with nature, food, science, haunted places, etc.), and/or the like.

Figure 3:
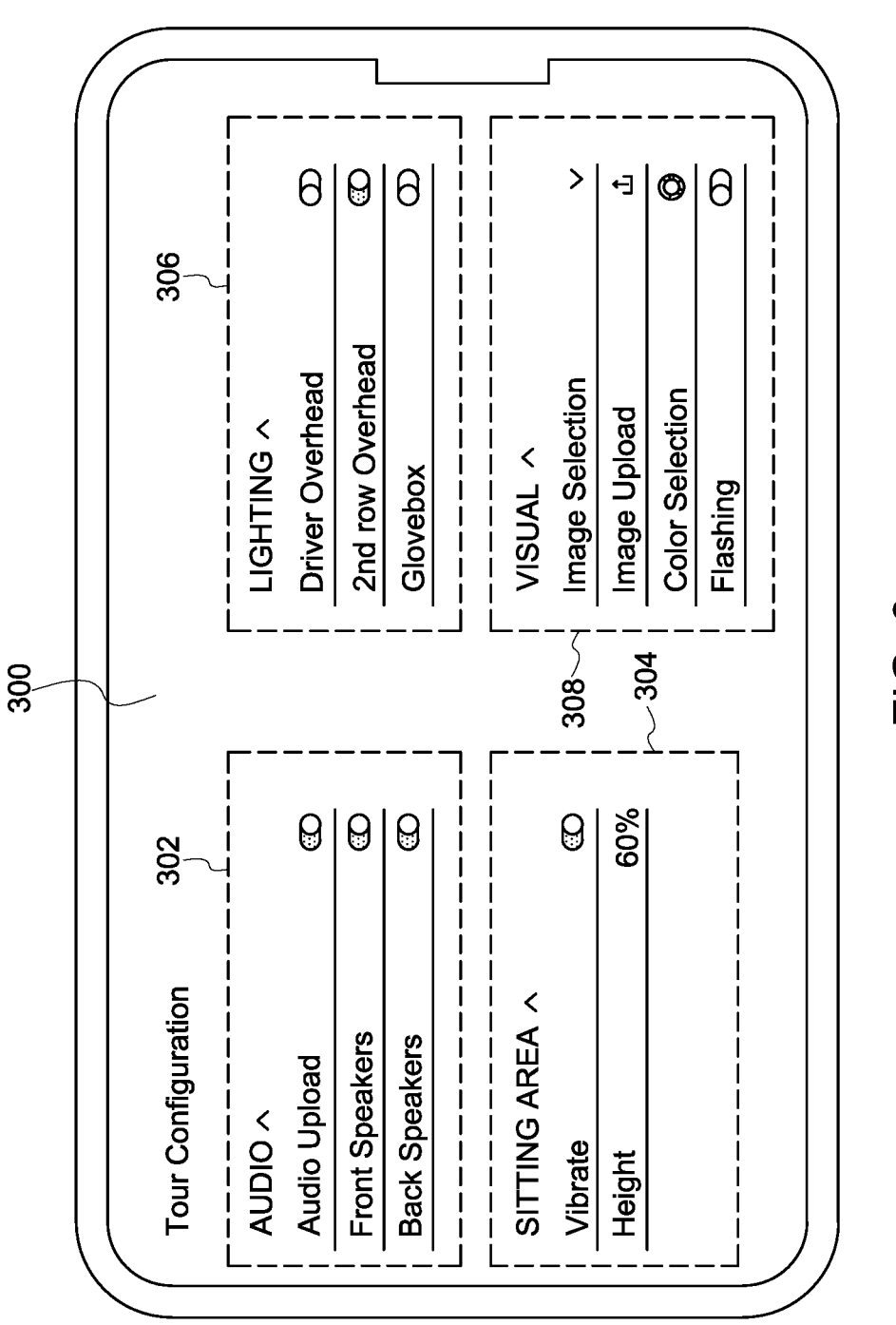
FIG. 3 depicts an example view of a user interface for configuring vehicle setting for a tour in accordance with the present disclosure.

An example view of a user interface 300 of a user device (that may be communicatively coupled with the server 206) associated with the operator is depicted in FIG. 3. FIG. 3 specifically depicts a view of the user interface 300 in which the operator may be adding one or more vehicle component settings (that may be part of the tour information) associated with a POI on the server 206. For example, the operator may input that audio should play in the vehicle 202 (e.g., using vehicle speakers) via the front and back vehicle speakers when the vehicle 202 may be located at the geolocation associated with the POI (POI geolocation), as shown in view 302 of FIG. 3. Further, the operator may input that vehicle sitting area (e.g., driver sitting area) should vibrate and the driver sitting area should elevate or retract to 60% height when the vehicle 202 may be located at the POI geolocation, as shown in view 304. The operator may further input that vehicle's second row overhead lights may activate, while driver overhead light and glovebox light may not activate, when the vehicle 202 may be located at the POI geolocation, as shown in view 306. Furthermore, the operator may upload/add one or more images associated with the POI that may be displayed on a vehicle infotainment system screen when the vehicle 202 may be located at the POI geolocation, as shown in view 308. The operator may additionally input whether the display screen associated with the vehicle infotainment system should flash or not, and associated display colors, when the vehicle 202 may be located at the POI geolocation.

Responsive to the operator's user device adding/transmitting the tour information described above to the server 206, the server 206 may receive the tour information. In some aspects, a server operator may screen the received tour information for quality and/or quantity checks before enabling the server 206 to store the tour information, as described above.

In a manner similar to the one described above, the server 206 may receive tour information associated with a plurality of tours from a plurality of operators and firms, and the server 206 may store the received tour information. The server 206 may transmit the tour information to the vehicle 202 when the vehicle 202 or the user device 204 transmits a request to the server 206 to obtain the tour information, via the network 208.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a tour management system 214 (or system 214). The VCU 212 may include a plurality of Electronic Control Units (ECUs) 216 disposed in communication with the automotive computer 210.

The user device 204 may connect with the automotive computer 210 and/or the system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the system 214 may be installed anywhere in the vehicle 202, in accordance with the disclosure. Further, the automotive computer 210 may operate as a functional part of the system 214. The automotive computer 210 may be or include an electronic vehicle controller, having one or more processor(s) 218 and a memory 220. Moreover, the system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage medium or memory storing a tour management program code. The memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 may include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, one or more ambient weather or temperature sensors, vehicle interior and exterior cameras, steering wheel sensors, inertial measurement unit (IMU), etc.

In some aspects, the VCU 212 may control vehicle operational aspects and implement one or more instruction sets received from the user device 204, from one or more instruction sets stored in the memory 220, including instructions operational as part of the system 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus. In some aspects, the TCU 228 may be configured to determine a real-time vehicle geolocation, e.g., via the NAV receiver 236.

The ECUs 216 may control aspects of vehicle operation and communication using inputs from human drivers, inputs from the automotive computer 210, the system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, sitting area vibration, sitting area height, etc. The BCM 222 may also operate as a gateway for bus and network interfaces to interact with remote ECUs (not shown in FIG. 2).

The DAT controller 230 may provide Level-1 through Level-3 automated driving and driver assistance functionality that may include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that may identify users based on facial recognition, voice recognition, fingerprint identification, or other biological identification means. In other aspects, the infotainment system 240 may be further configured to receive user instructions via the touchscreen interface portion, and/or output or display notifications, navigation maps, tour information, etc. on the touchscreen interface portion.

The computing system architecture of the automotive computer 210, the VCU 212, and/or the system 214 may omit certain computing modules. It should be readily understood that the computing environment depicted in FIG. 2 is an example of a possible implementation according to the present disclosure, and thus, it should not be considered as limiting or exclusive.

In accordance with some aspects, the system 214 may be integrated with and/or executed as part of the ECUs 216. The system 214, regardless of whether it is integrated with the automotive computer 210 or the ECUs 216, or whether it operates as an independent computing system in the vehicle 202, may include a transceiver 242, a processor 244, and a computer-readable memory 246.

The transceiver 242 may be configured to receive information/inputs from one or more external devices or systems, e.g., the user device 204, the server(s) 206, and/or the like, via the network 208. For example, the transceiver 242 may be configured to receive a user request from the user 106 via the user device 204 to view tour information on the infotainment system 240 or the user device 204. The transceiver 242 may be further configured to receive the tour information, a digital map of the geographical area where the vehicle 202 may be located, information associated with historical user tour selection, and/or the like from the server 206. Further, the transceiver 242 may transmit notifications, requests, signals, etc. to the external devices or systems. In addition, the transceiver 242 may be configured to receive information/inputs from vehicle components such as the infotainment system 240, the vehicle sensory system 234, one or more ECUs 216, and/or the like. Further, the transceiver 242 may transmit signals (e.g., command signals) or notifications to the vehicle components such as the infotainment system 240, the BCM 222, and/or the like.

The processor 244 and the memory 246 may be same as or similar to the processor 218 and the memory 220, respectively. In some aspects, the processor 244 may utilize the memory 246 to store programs in code and/or to store data for performing aspects in accordance with the disclosure. The memory 246 may be a non-transitory computer-readable storage medium or memory storing the tour management program code. In some aspects, the memory 246 may additionally store instructions/information/data obtained from the server 206, the user device 204, and/or the like.

In operation, the user 106 may input a request, on the infotainment system 240 or the user device 204, to view tour information associated with a plurality of tours that may be available in the geographical area where the vehicle 202 may be located. In some aspects, the user 106 may input the request when the vehicle 202 may be stationary. A stationary vehicle, as described herein the present disclosure, may indicate a vehicle that is either parked or moving at a speed of less than four to five miles per hour.

In some aspects, along with the request, the user 106 may also input one or more user interest areas, e.g., nature or haunted places, associated with which the user 106 may desire to take a tour. Responsive to the user 106 inputting the request, the processor 244 may obtain a trigger signal from the infotainment system 240 or the user device 204. The trigger signal may include the request and the user interest areas (if provided by the user 106).

Responsive to obtaining the trigger signal and the user interest areas, the processor 244 may obtain, via the transceiver 242, preview of tour information associated with a plurality of tours that may be available in the geographical area where the vehicle 202 may be located and that may be associated with the user interest areas. In a scenario where the user 106 does not provide any interest area, the processor 244 may obtain preview of tour information associated with all the tours that may be available in the geographical area where the vehicle 202 may be located, and may shortlist a plurality of recommended tours from all the tours based on the information associated with historical tours taken by the user 106 (that the processor 244 may obtain from the server 206 via the transceiver 242). In other aspects, when the user 106 does not provide any interest area, the server 206 may itself identify the plurality of recommended tours for the user 106 based on the information associated with the historical tours, and may transmit the preview of tour information associated with the plurality of recommended tours to the processor 244 (via the transceiver 242).

In some aspects, if the user 106 is travelling on a route from a source location to a destination location, the user 106 may provide the source and destination locations to the processor 244 (via the transceiver 242, and the infotainment system 240 or the user device 204), and request the processor 244 to provide tour information associated with tours available in the route between the source and the destination locations. In this case, the processor 244 may obtain preview of tour information associated with such available tours in the user's route from the server 206.

Figure 4:
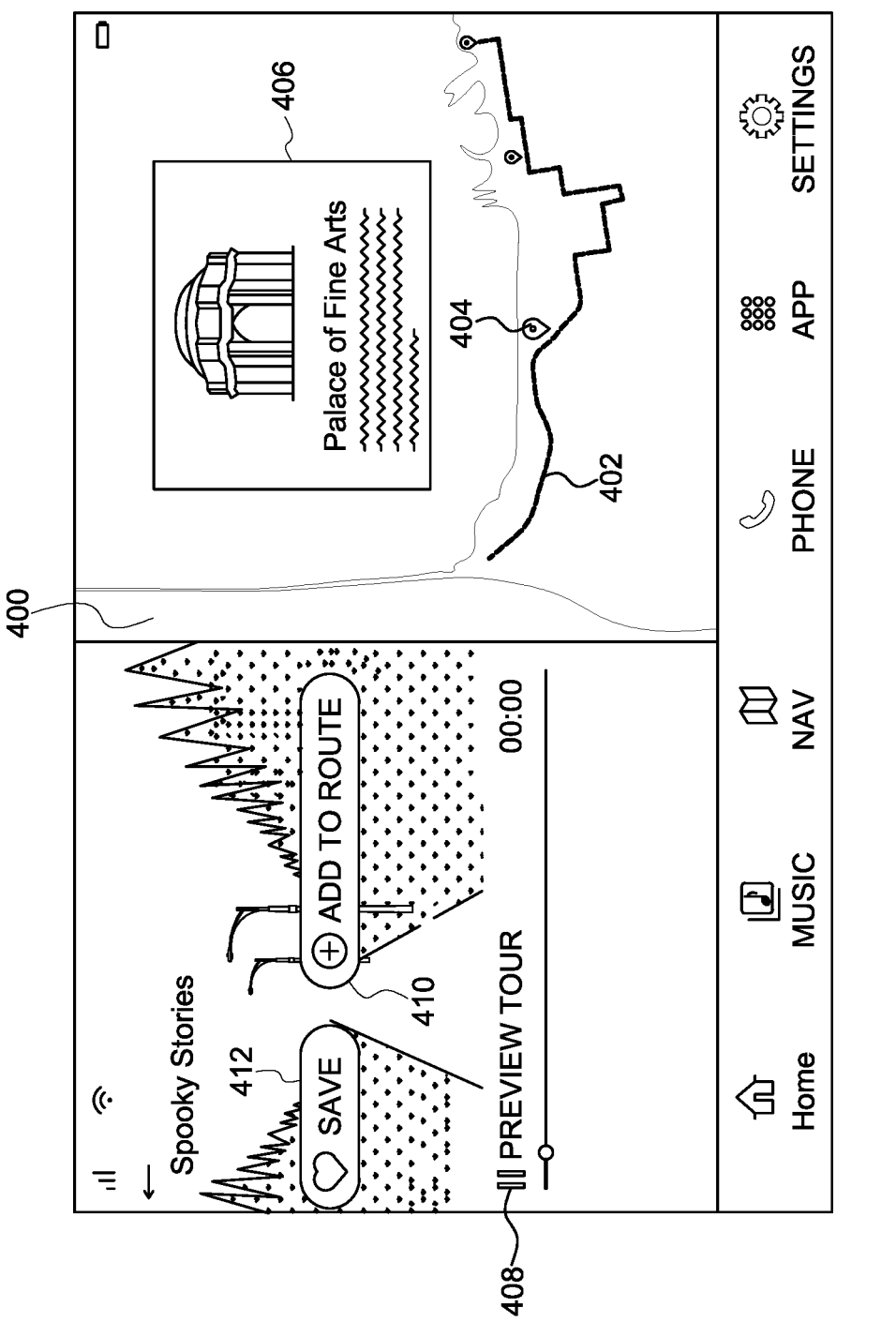
FIG. 4 depicts an example first view of a vehicle infotainment system screen in accordance with the present disclosure.

Responsive to obtaining the preview of tour information associated with the plurality of tours from the server 206 as described above, the processor 244 may cause the infotainment system 240 to display names of the tours (as shown in view 108 of FIG. 1) and/or the preview of tour information. In some aspects, the processor 244 may display the preview of tour information when the user 106 inputs a request on the infotainment system 240 to view the preview of tour information associated with a tour (e.g., by clicking on a tour name or a tour icon displayed on the infotainment system 240). An example preview of tour information associated with a tour ("Spooky Stories" tour) is depicted in FIG. 4. FIG. 4 specifically depicts a user interface 400 of the infotainment system 240 on which the preview of tour information associated with "Spooky Stories" tour is displayed. As depicted in FIG. 4, the preview may include a portion of a route 402 associated with the tour overlaid on a digital map of a geographical area where the route 402 may be present, geolocation icons 404 associated with one or more POIs present on the route 402, an image and/or snippets of textual content 406 associated with one or more POIs, an audio (or video) preview 408 configured to audibly output an overview or summary of the tour, and/or the like.

Responsive to viewing the tour names associated with the plurality of tours and/or the preview of tour information associated with one or more tours on the infotainment system 240, the user 106 may select a tour to take or enroll into. In some aspects, the user 106 may select the tour by clicking on an icon "Add to route" 410 on the user interface 400, or by inputting the tour selection by any other means available on the infotainment system 240 or the user device 204. If the user 106 does not desire to select the tour, but may be interested in enrolling into the tour in the future, the user 106 may click on an icon "Save" 412 on the user interface 400 to cause the server 206 to save the tour in a user account on the server 206 for future reference.

Responsive to the user 106 selecting the tour (e.g., when the user 106 clicks on the icon "Add to route" 410), the processor 244 may obtain another trigger signal from the infotainment system 240 (or the user device 204) indicating to the processor 244 that the user 106 desires to take or enroll into the selected tour. The trigger signal may include the user selection of the tour. Responsive to obtaining the trigger signal described above, the processor 244 may obtain "full" tour information associated with the selected tour from the server 206 (via the transceiver 242) and a real-time vehicle geolocation from the TCU 228.

Although the description above describes an aspect where the processor 244 obtains the trigger signal to obtain full tour information when the user 106 selects the tour on the infotainment system 240 (or the user device 204), in other aspects, the processor 244 may obtain the trigger signal when the vehicle 102 moves or commences travel on the tour. In this case, the processor 244 may obtain the trigger signal from one or more ECUs 216, and may obtain the full tour information from the server 206 when the vehicle 202 begins to move.

Figure 5:
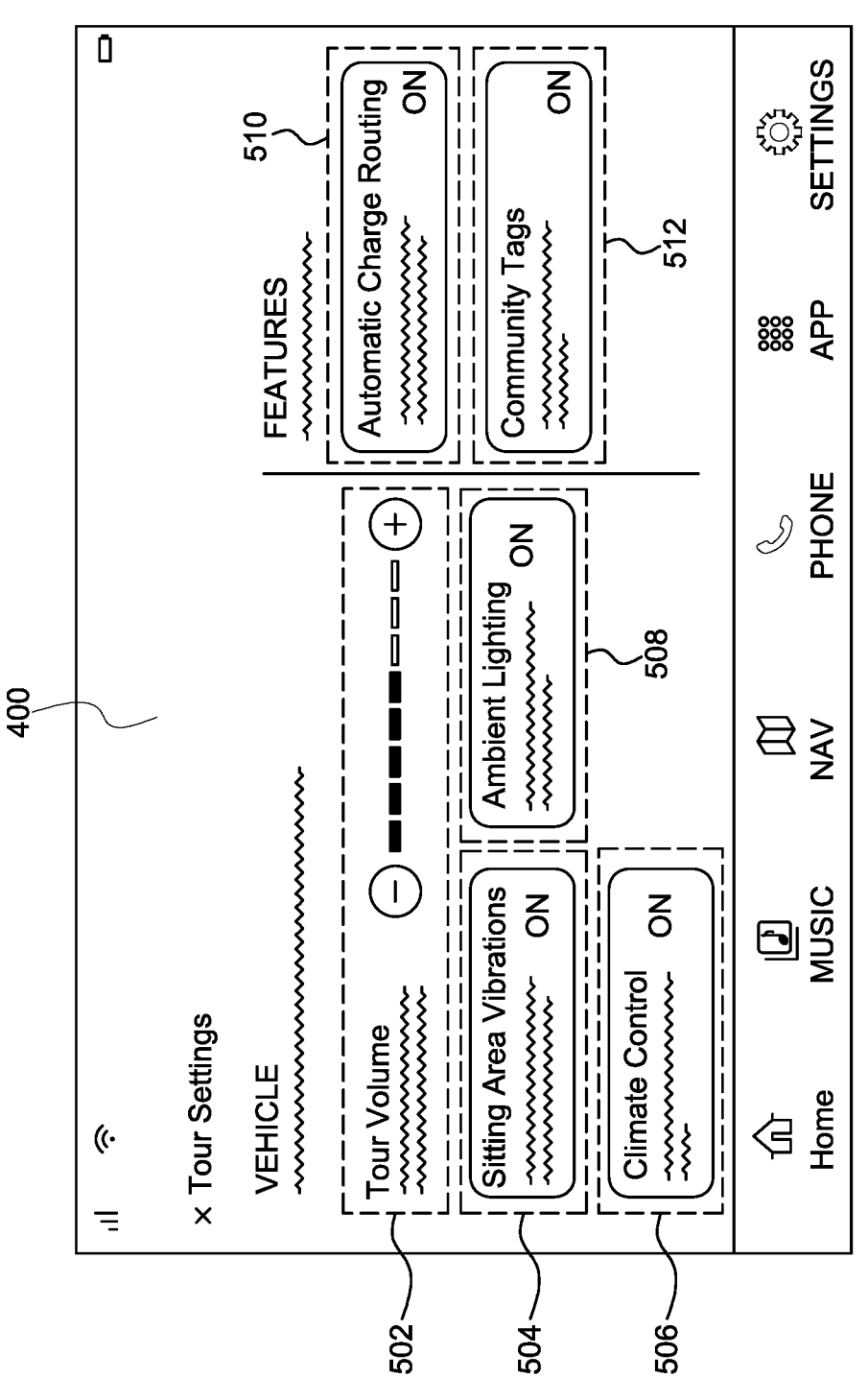
FIG. 5 depicts an example second view of a vehicle infotainment system screen in accordance with the present disclosure.

In some aspects, the user 106 may configure vehicle settings before commencing on the selected tour. For example, as shown in FIG. 5, the user 106 may adjust volume 502 of audio messages that may be output from the infotainment system 240 or vehicle speakers (not shown) when the vehicle 202 passes through the plurality of POIs on the tour, enable or disable sitting area vibration feature 504, enable or disable climate control feature 506 (i.e., whether the processor 244 may be allowed or disallowed to change vehicle HVAC settings based on the tour information), enable or disable ambient lighting control feature 508 (i.e., whether the processor 244 may be allowed or disallowed to change vehicle light settings based on the tour information), enable or disable automatic charge routing feature 510 (i.e., whether the processor 244 may be allowed or disallowed to automatically change route of the tour to add chargers/gas stations on the route, based on vehicle battery state of charge (SOC) or vehicle fuel level), enable or disable community tags feature 512 (i.e., whether the processor 244 may be allowed or disallowed to display social community tags on the infotainment system 240 when the vehicle 202 may be travelling on the tour), and/or the like.

Responsive to the user 106 configuring the vehicle settings, the user 106/vehicle 202 may commence travel on the tour. In some aspects, the user 106/vehicle 202 may commence travel on the tour directly after selecting the tour, and may skip configuring the vehicle settings.

Figure 6:
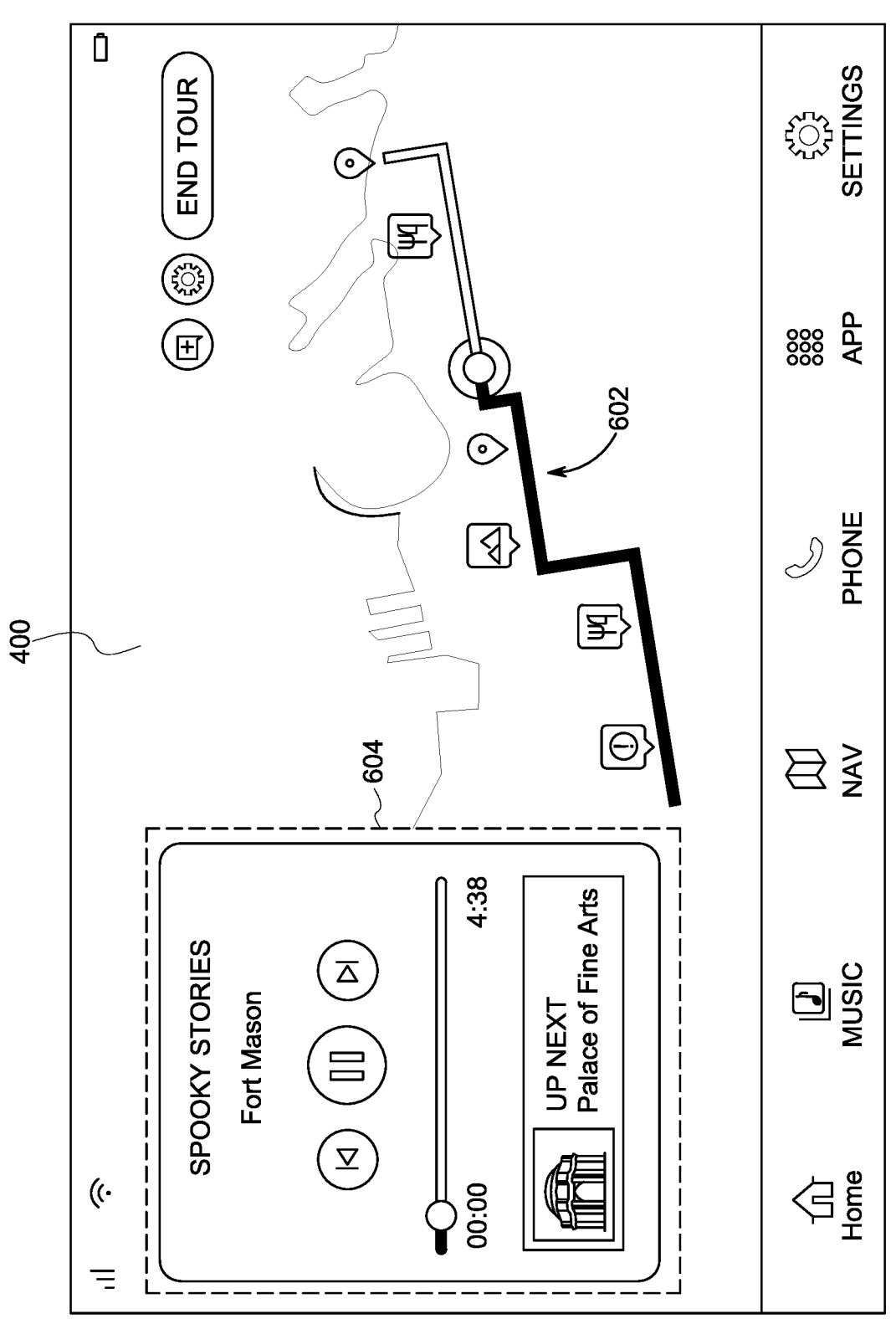
FIG. 6 depicts an example third view of a vehicle infotainment system screen in accordance with the present disclosure.

In some aspects, when the vehicle 202 commences travel on the tour or when the user 106 selects the tour on the infotainment system 240, the processor 244 may obtain, in addition to the full tour information, a digital map (e.g., a digital map 602, as shown in FIG. 6) of the geographical area including the plurality of POIs associated with the selected tour from the server 206 (or any other server providing navigation services). The digital map 602 may include location icons associated with geolocations of the plurality of POIs. When the vehicle 202 commences travel on the tour, the processor 244 may cause the infotainment system 240 to display the digital map 602. The processor 244 may further determine (or obtain from the server 206) turn-by-turn navigation instructions based on the digital map 602 when the vehicle 202 may be travelling on the tour. The processor 244 may cause the infotainment system 240 to output the turn-by-turn navigation instructions to assist the user 106/vehicle 202 in travelling on the tour.

In further aspects, the processor 244 may obtain the real-time vehicle geolocation from the TCU 228 when the vehicle 202 may be travelling on the tour. Responsive to obtaining the real-time vehicle geolocation, the processor 244 may check or determine if a predefined condition may be met based on the obtained tour information and the real-time vehicle geolocation. In some aspects, the processor 244 may determine that the predefined condition may be met when the real-time vehicle geolocation may be equivalent to a geolocation of a POI (or POI geolocation) of the plurality of POIs associated with the tour. Stated another way, the processor 244 may determine that the predefined condition may be met when the vehicle 202 may be located in proximity to the POI geolocation or at the POI geolocation.

Responsive to determining that the predefined condition may be met, the processor 244 cause audio or video message, and/or textual content associated with the POI to be played/displayed on the infotainment system 240 (as shown in view 604 of FIG. 6), and/or may modify settings of a vehicle component (or one or more vehicle components) from a first setting to a second setting based on the tour information, as described below.

In some aspects, responsive to determining that the predefined condition may be met, the processor 244 may first determine whether the vehicle 202 may be in motion or stationary based on inputs obtained from one or more ECUs 216. The processor 244 may cause the infotainment system 240 to output an audio message associated with the POI (as determined from the "full" tour information) when the processor 244 determines that the vehicle 202 may be in motion. On the other hand, the processor 244 may cause the infotainment system 240 to output the video message and/or the textual content when the processor 244 determines that the vehicle 202 may be stationary. In this manner, based on vehicle's motion status, the processor 244 may determine an optimum type of content/message to be displayed or output from the infotainment system 240, and may accordingly cause the infotainment system 240 to display/output audio, video or textual message/content.

In a similar manner, responsive to determining that the predefined condition may be met, the processor 244 may modify settings of one or more vehicle components based on the vehicle's motion status and the tour information. Examples of the vehicle components include, but are not limited to, a vehicle light, a vehicle sitting area, a vehicle fragrance system, the infotainment system 240, a vehicle speaker system, and a vehicle HVAC system, and/or the like. In a first exemplary aspect, responsive to determining that the predefined condition may be met and the vehicle 202 may be stationary, the processor 244 may determine and modify settings of one or more vehicle components from the first setting to the second setting based on the tour information. For example, the processor 244 may cause, via the BCM 222, one or more interior vehicle lights to change from a fully illuminated state ("first setting") to a flashing state ("second setting") based on the tour information, when the vehicle 202 may be stationary. As another example, the processor 244 may cause volume settings of the vehicle speaker system or the infotainment system 240 to change from a low volume state ("first setting") to a high volume state ("second setting") based on the tour information, when the vehicle 202 may be stationary. As yet another example, the processor 244 may cause, via the BCM 222, driver's sitting area to move from a non-vibratory state ("first setting") to a vibratory state ("second setting") based on the tour information, when the vehicle 202 may be stationary. Stated another way, the processor 244 may cause the driver's sitting area to vibrate when the predefined condition may be met and when the vehicle 202 may be stationary.

In a second exemplary aspect, responsive to determining that the predefined condition may be met and the vehicle 202 may be in motion, the processor 244 may determine and modify settings of one or more vehicle components from the first setting to a third setting based on the tour information. For example, the processor 244 may cause, via the BCM 222, one or more interior vehicle lights to change from a fully illuminated state ("first setting") to a dimmed state ("third setting") based on the tour information, when the vehicle 202 may be in motion. As another example, the processor 244 may change, via the BCM 22, an activation state of the vehicle fragrance system from a deactivate state ("first setting") to an activated state ("third setting") based on the tour information, when the vehicle 202 may be in motion. As yet another example, the processor 244 may increase, via the BCM 222, heating or cooling effects or fan speed associated with the vehicle HVAC system based on the tour information, when the vehicle 202 may be in motion.

In this manner, responsive to determining that the predefined condition may be met, the processor 244 may modify settings associated with one or more vehicle components based on the tour information and the vehicle's motion status. In further aspects, when the vehicle 202 may be travelling on the tour, the processor 244 may enable the user 106 to request additional information (which may be paid) associated with one or more POIs from the server 206 via the infotainment system 240. The processor 244 may further enable the user 106 to add/upload photos, comments, content, etc. associated with one or more POIs on a social community hosted on the server 206, interact with content provided by other users, provide suggestions/feedback on the tour information associated with the tour, and/or the like. Furthermore, if the vehicle 202 deviates from the route associated with the tour, the processor 244 may be configured to pause the tour and resume the tour (after skipping one or more POIs that the vehicle 202 may have missed because of route deviation) when the vehicle 202 returns to the route associated with the tour.

The processor 244 may additionally enable the user 106 to provide reviews, feedback, suggestions, etc. associated with the tour to the server 206 via the infotainment system 240, when the vehicle 202 finishes travelling on the tour and becomes stationary.

In some aspects, the processor 244 may be further configured to obtain one or more tutorials related to usage of tour information and vehicle touring feature (i.e., feature to enable selection of tours, configuring of vehicle settings, etc.) from the server 206, and display on the infotainment system 240 for user's reference. The user 106 may view the tutorials anytime the vehicle 202 may be stationary to understand how to use the vehicle's touring feature described above.

Figure 7:
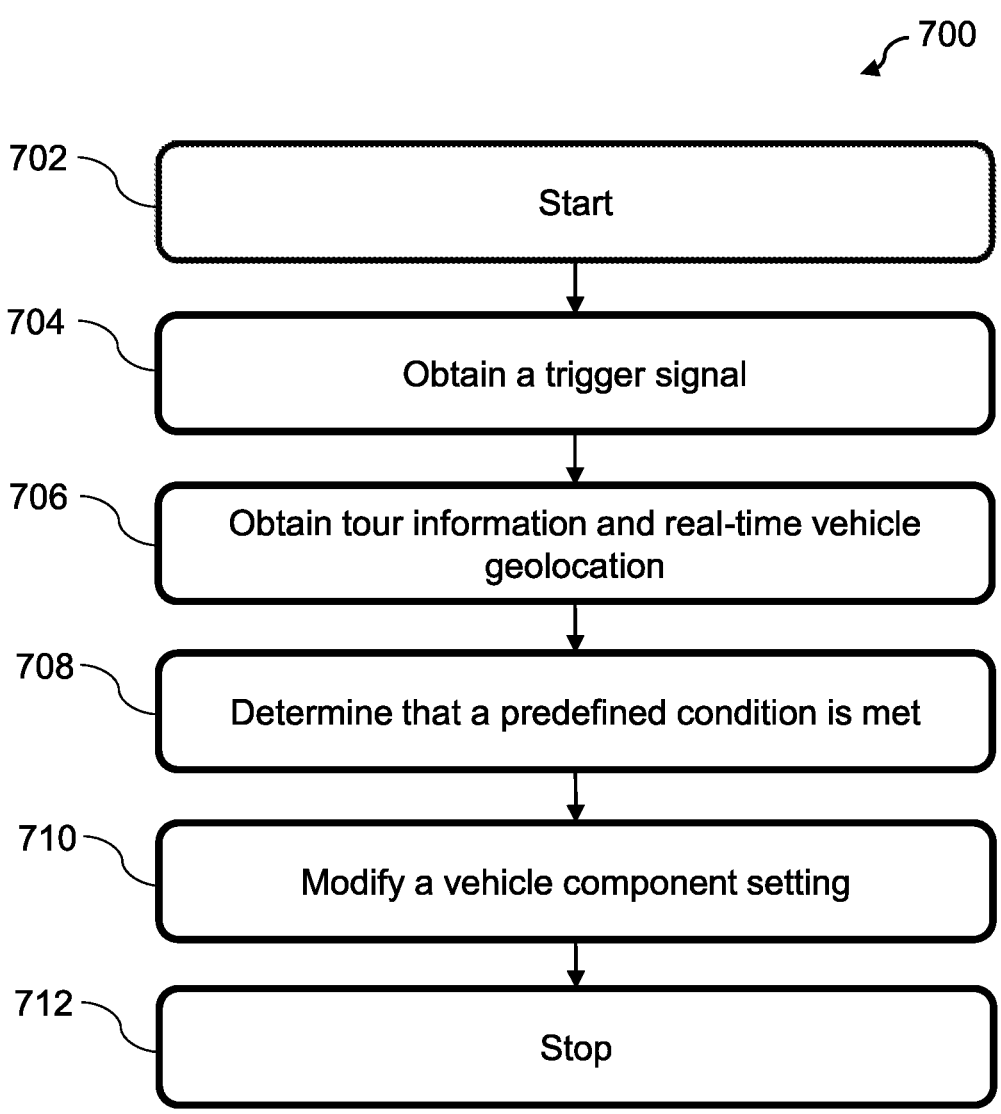
FIG. 7 depicts a flow diagram of an example method to facilitate touring in a vehicle in accordance with the present disclosure.

FIG. 7 depicts a flow diagram of an example method 700 to facilitate touring in the vehicle 202 in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 700 starts at step 702. At step 704, the method 700 may include obtaining, by the processor 244, the trigger signal from the infotainment system 240, the VCU 212 and/or the user device 204. As described above, the processor 244 may obtain the trigger signal when the user 106 selects a tour from the plurality of tours, or when the vehicle 202 commences travel on the tour.

At step 706, the method 700 may include obtaining, by the processor 244, the tour information from the server 206 and the real-time vehicle geolocation from the TCU 228. At step 708, the method 700 may include determining, by the processor 244, that the predefined condition may be met based on the tour information and the real-time vehicle geolocation. As described above, the predefined condition may be met when the real-time vehicle geolocation may be equivalent to the POI geolocation.

At step 710, the method 700 may include modifying, by the processor 244, settings associated with one or more vehicle components based on the tour information, responsive to determining that the predefined condition may be met as described above.

The method 700 may end at step 712.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a transceiver;
an infotainment system;
a body control module;
a telematics control unit configured to determine a real-time vehicle geolocation; and
a processor communicatively coupled with the transceiver and the telematics control unit, wherein the processor is configured to:
obtain a first trigger signal from the infotainment system in response to a user request received at the infotainment system, the first trigger signal including the user request and user interest areas;
obtain, based on the first trigger signal, a preview of tour information associated with a plurality of tours and the real-time vehicle geolocation, the plurality of tours being associated with the real-time vehicle geolocation and the user interest areas;
cause the infotainment system to display the preview of the tour information, wherein the preview includes a portion of a route associated with a tour, of the plurality of tours, overlaid on a map of a geographical area associated with the real-time vehicle geolocation;
receive user input selecting a first tour of the plurality of tours;
receive a second trigger signal indicating selection of the first tour;
obtain expanded information about the first tour;
determine that the real-time vehicle geolocation is equivalent to a geo-location of a first point of interest (POI) associated with the first tour; and
modify, using the body control module, a first vehicle component setting associated with a vehicle component to a second vehicle component setting, responsive to determining that the real-time vehicle geolocation is equivalent to the geo-location of the point of interest associated with the first tour, wherein the first vehicle component setting includes one or more of: illumination status of one or more interior lights of the vehicle, active or deactivate a fragrance system of the vehicle, a setting associated with an HVAC system of the vehicle, adjust a volume of a speaker of the vehicle, or vibrate a driver sitting area of the vehicle.

2. The vehicle of claim 1, wherein the transceiver receives the preview of the tour information from a server.

3. The vehicle of claim 1, wherein the expanded tour information comprises at least one of: a plurality of geolocations associated with a plurality of points of interest (POIs) on the first tour, an audio message or a video message associated with one or more POIs of the plurality of POIs, a textual content associated with one or more POIs of the plurality of POIs, and one or more vehicle component settings associated with one or more POIs of the plurality of POIs.

4. The vehicle of claim 1, wherein the processor is further configured to determine whether the vehicle is in motion or stationary, prior to receiving the second trigger signal.

5. The vehicle of claim 4, wherein the processor is further configured to:

determine the second vehicle component setting associated with the first POI based on the tour information, responsive to determining that the vehicle is in motion; and modify the first vehicle component setting to the second vehicle component setting, responsive to determining the second vehicle component setting.

6. The vehicle of claim 5, wherein the processor is further configured to:

determine a third vehicle component setting associated with the first POI based on the tour information, responsive to determining that the vehicle is stationary; and modify the first vehicle component setting to the third vehicle component setting, responsive to determining the third vehicle component setting.

7. The vehicle of claim 4, wherein the processor is further configured to:

cause the infotainment system to output the audio message associated with the first POI, responsive to determining that the vehicle is in motion; and cause the infotainment system to output at least one of the video message and the textual content, responsive to determining that the vehicle is stationary.

8. The vehicle of claim 1, wherein the processor is further configured to:

obtain a digital map of a geographical area comprising a plurality of POIs from a server, wherein the digital map is associated with the map; and cause the infotainment system to display the digital map, wherein the digital map comprises a plurality of location icons associated with the plurality of POIs.

9. The vehicle of claim 8, wherein the processor is further configured to:

determine turn-by-turn navigation instructions based on the digital map, when the vehicle is travelling on a route associated with the first tour; and output the turn-by-turn navigation instructions.

10. The vehicle of claim 1, wherein the vehicle component comprises at least one of: a vehicle light, a vehicle sitting area, a vehicle fragrance system, the infotainment system, a vehicle speaker system, and a vehicle heating, ventilation, and air conditioning (HVAC) system.

11. The vehicle of claim 1, wherein the processor obtains the second trigger signal when the vehicle commences travel on the first tour.

12. The vehicle of claim 1, wherein the processor obtains the second trigger signal after the first tour is selected.

13. A method comprising:

obtaining, by a processor of a vehicle, a first trigger signal, the first trigger signal including a user request and user interest information;

obtaining, by the processor, a preview of tour information associated with a plurality of tours and a real-time vehicle geolocation associated with the vehicle, responsive to obtaining the first trigger signal;

displaying, on an infotainment system of the vehicle, the preview of the tour information, the preview including a portion of a route associated with a tour overlaid on a map of a geographical area associated with the real-time vehicle geo-location;

receiving user input selecting a first tour of the plurality of tours;

receiving a second trigger signal indicating selection of the first tour;

obtaining expanded information about the first tour;

determining, by the processor, that the real-time vehicle geolocation is equivalent to a geo-location of a first point of interest (POI) associated with the first tour; and modifying, by the processor, a first vehicle component setting associated with a vehicle component to a second vehicle component setting, responsive to determining that the real-time vehicle geolocation is equivalent to the geo-location of the point of interest associated with the first tour, wherein the first vehicle component setting includes one or more of: illumination status of one or more interior lights of the vehicle, active or deactivate a fragrance system of the vehicle, a setting associated with an HVAC system of the vehicle, volume of a speaker of the vehicle, or vibration status of a driver sitting area of the vehicle.

14. The method of claim 13, wherein the expanded tour information comprises at least one of: a plurality of geolocations associated with a plurality of points of interest (POIs) on the tour, an audio message or a video message associated with one or more POIs of the plurality of POIs, a textual content associated with one or more POIs of the plurality of POIs, and one or more vehicle component settings associated with one or more POIs of the plurality of POIs.

15. The method of claim 13, wherein the vehicle component comprises at least one of: a vehicle light, a vehicle sitting area, a vehicle fragrance system, the infotainment system, a vehicle speaker system, and a vehicle heating, ventilation, and air conditioning (HVAC) system.

16. The method of claim 13, wherein receiving the second trigger signal comprises receiving the second trigger signal when the vehicle commences travel on the first tour.

17. A non-transitory computer-readable storage medium having instructions stored thereupon which, when executed by a processor, cause the processor to:

obtain a first trigger signal from an infotainment system of a vehicle in response to a user request received at the infotainment system, the first trigger signal including the user request and user interest areas;

obtain, in response to the first trigger signal, a preview tour information associated with a plurality of tours and a real-time vehicle geolocation associated with a vehicle;

display, on the infotainment system, the preview of the tour information, wherein the preview includes a portion of a route associated with a tour overlaid on a map of a geographical area associated with the real-time vehicle geo-location;

receive user input selecting a first tour of the plurality of tours;

receive a second trigger signal indicating selection of the first tour;

obtain expanded information about the first tour;

determine that the real-time vehicle geolocation is equivalent to a geo-location of a first point of interest (POI) associated with the first tour; and modify a first vehicle component setting associated with a vehicle component to a second vehicle component setting, responsive to determining that the real-time vehicle geolocation is equivalent to the geo-location of the point of interest associated with the first tour, 5 wherein the first vehicle component setting includes one or more of: illumination status of one or more interior lights of the vehicle, active or deactivate a fragrance system of the vehicle, a setting associated with an HVAC system of the vehicle, adjust a volume 10 of a speaker of the vehicle, or vibrate a driver sitting area of the vehicle.

\* \* \* \* \*